(12) United States Patent
Kamataki

(10) Patent No.: US 7,281,164 B2
(45) Date of Patent: Oct. 9, 2007

(54) INFORMATION PROCESSING DEVICE AND RECOVERY METHOD THEREOF

(75) Inventor: Takahisa Kamataki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 568 days.

(21) Appl. No.: 10/634,203

(22) Filed: Aug. 5, 2003

(65) Prior Publication Data

US 2004/0044889 A1 Mar. 4, 2004

(30) Foreign Application Priority Data

Aug. 30, 2002 (JP) ............................ 2002-253900

(51) Int. Cl.
  G06F 11/00 (2006.01)
  G06F 11/22 (2006.01)
(52) U.S. Cl. .......................................... 714/36; 714/6
(58) Field of Classification Search .................. 714/26, 714/36
See application file for complete search history.

(56) References Cited

U.S. PATENT DOCUMENTS

| | | | | |
|---|---|---|---|---|
| 5,732,268 A * | 3/1998 | Bizzarri | ......................... | 713/2 |
| 5,748,877 A * | 5/1998 | Dollahite et al. | ............. | 714/36 |
| 5,987,625 A * | 11/1999 | Wolff | ......................... | 714/36 |
| 6,009,541 A * | 12/1999 | Liu et al. | ....................... | 714/36 |
| 6,038,663 A * | 3/2000 | Feldman | ....................... | 713/1 |
| 6,202,207 B1 * | 3/2001 | Donohue | .................... | 717/173 |
| 6,400,717 B1 * | 6/2002 | Von Ahnen et al. | .... | 370/395.63 |
| 6,446,203 B1 * | 9/2002 | Aguilar et al. | .................. | 713/2 |
| 6,459,624 B1 * | 10/2002 | Kuo | ....................... | 365/185.33 |
| 6,889,340 B1 * | 5/2005 | Bramley, Jr. | ................... | 714/6 |
| 6,892,323 B2 * | 5/2005 | Lin | ............................. | 714/36 |
| 6,931,525 B2 * | 8/2005 | Numata et al. | ............ | 713/100 |
| 2002/0178242 A1 * | 11/2002 | Eda | ............................ | 709/222 |
| 2005/0044454 A1 * | 2/2005 | Moshayedi | ................... | 714/54 |

FOREIGN PATENT DOCUMENTS

| | | |
|---|---|---|
| JP | 8-179937 | 7/1996 |
| JP | 10-283172 | 10/1998 |
| JP | 2000-295142 | 10/2000 |
| JP | 2001-100983 | 4/2001 |
| JP | 2001-202159 | 7/2001 |
| JP | 2001-228938 | 8/2001 |
| JP | 2002-123400 | 4/2002 |

OTHER PUBLICATIONS

Wikipedia's IP Address Article revision from May 15, 2002 http://en.wikipedia.org/w/index.php?title=IP_address&oldid=394450&printable=yes.*

(Continued)

Primary Examiner—Scott Baderman
Assistant Examiner—Joseph Schell
(74) Attorney, Agent, or Firm—Greer, Burns & Crain, Ltd.

(57) ABSTRACT

An information processing device and a recovery method thereof make it possible to improve strength of a system and so on against a failure, to give reliability and stability of information processing, and to easily perform restoration of a system failure and update of a system. That is, the present invention is directed to the information processing device connectable to a network including one or plural computers and the recovery method thereof, and first and second storages and a processing unit are provided. The first storage stores a first basic software, and the second storage stores a second basic software. The second basic software includes software which makes the information processing device read-in data via the network. The processing unit recognizes an operating mode by means of a boot program, and makes either the first basic software or the second basic software operate based on the recognition of the operating mode.

20 Claims, 13 Drawing Sheets

OTHER PUBLICATIONS

Wikipedia's Flash Memory Article revision from Feb. 14, 2003 http://en.wikipedia.org/w/index.php?title=Flash_memory&oldid=919068.*

Wikipedia's EEPROM Article revision from Aug. 19, 2002 http://en.wikipedia.org/w/index.php?title=EEPROM&oldid=204796&printable=yes.*

* cited by examiner

INFORMATION PROCESSING DEVICE AND RECOVERY METHOD THEREOF

BACKGROUND OF THE INVENTION

1. Field of the Invention

The present invention relates to an information processing device used in a device like a server which constructs a network together with one or plural computers, and relates to a recovery method of this information processing device. In particular, it relates to an information processing device which is connectable to a network including one or plural computers and gives information to a client of the computer or the computers in the network in accordance with a requirement of the client, and relates to a recovery method thereof. Furthermore, it relates to an information processing device which has a plurality of starting modes and makes it possible to perform processing including restoration and update of a system, and relates to a recovery method thereof.

2. Description of the Related Art

A server offering a service through a network is an information processing device which constructs a network together with one or plural computers namely one or plural clients receiving an offer of the service, performs communication with a client, and offers a service required by the client. A high-speed communication line of the ISDN (Integrated Services Digital network), the ADSL (Asymmetric Digital Subscriber Line) contained within the xDSL (x Digital Subscriber Line), cable TV internet connection and so on is rapidly spread, and a construction of network in respect to a plurality of stand-alone computers provided in a home is rapidly increasing. Under an environment like this, a server which constructs a network together with a plurality of computers and gives necessary information to a client of a computer in the network is an indispensable information processing device in order to construct the network.

In an information processing device like a server mentioned above, the present invention is a technique connected with information processing which has a plurality of starting modes and thereby can easily perform various processes including update of a system and restorative operation at the time of a system failure.

By the way, when a failure has occurred in a computer, there are cases in which revision is performed by reinstalling a system program. In this case, as a manner, a CD-ROM for recovery use and so on are prepared, and a reinstallation is performed by starting from the CD-ROM. As a manner performing a boot via a network, the PXE (Preboot execution Environment) exists. The PXE provides no more than a quasi-starting disc by referring to a server existing on the network.

In addition, the manner using the CD-ROM for recovery use needs a CD-ROM drive in a system side of a restorative object in addition to the CD-ROM for recovery use. However, the server does not need an input unit like a keyboard and a display unit like a CRT display, and the server does not have the CD-ROM drive. Therefore, the manner using the CD-ROM is unsuitable for restoration of the server. The manner performing a boot via a network utilizes only the network as a virtual drive, and a load of a device side providing a system becomes larger because a special-purpose program and so on are needed. Furthermore, in case of performing update of a system, if the update of the system is tried to perform after starting the system of an update object, update of a core namely a portion of a basic software is difficult.

In respect to an information processing device such as a server, techniques connected with rewriting and starting of a program are disclosed in the following patent documents, for example.

(1) The Japanese Patent Laid Open Publication No.10-283172 "FLASH ROM DATA REWRITE SYSTEM"
(2) The Japanese Patent Laid Open Publication No.2001-228938 "REMOTE STARTING METHOD"
(3) The Japanese Patent Laid Open Publication No.8-179937 "DEVICE AND METHOD FOR SWITCHING BOOT PROGRAM"
(4) The Japanese Patent Laid Open Publication No.2001-100983 "CONTROL METHOD OF COMPUTER, COMPUTER, AND RECORDING MEDIUM"
(5) The Japanese Patent Laid Open Publication No.2001-202159 "ELECTRONIC EQUIPMENT, DATA DELETING METHOD AND STORAGE MEDIUM"
(6) The Japanese Patent Laid Open Publication No.2000-295142 "SELF-DIAGNOSTIC DEVICE"
(7) The Japanese Patent Laid Open Publication No.2002-123400 "METHOD AND SYSTEM FOR TRANSFERRING, COMPUTER-READABLE MEDIUM AND PROGRAM"

The Japanese Patent Laid Open Publication No.10-283172 relates to a flash ROM data rewrite system for rewriting a program in a flash ROM with the flash ROM mounted on a substrate. In this flash ROM data rewrite system, an extended CPU board is connected to a host computer via an expansion bus. The extended CPU board comprises CPU, a flash ROM storing a starting program and so on, a first gate controlling a connection between the CPU and the flash ROM, a second gate controlling a connection between the host computer and the flash ROM, and a CPU starting mode switch circuit switching the first and second gates. If a modification arises in the starting program, the connection between the CPU and the flash ROM is interrupted by closing the first gate, the host computer and the flash ROM are connected by opening the second gate, and thereby a program write mode is set. Under this state, by writing a program into the flash ROM from the host computer, the modification of the starting program is performed without removing the flash ROM from the substrate. According to a constitution like this, the extended CPU board must be setup separate from the host computer, hardware mentioned above must be provided on the extended CPU board, and the CPU starting mode switch circuit and the first and second gates must be provided on the extended CPU board. Because of this, a necessary constitution and control for rewriting a program become complicated. Furthermore, a plurality of starting modes are not provided, and update of a system and restorative operation at the time of a system failure can not be performed with ease, either.

The Japanese Patent Laid Open Publication No.2001-228938 discloses a remote starting method for performing a remote power control of a device (a personal computer or a server) from a remote place via a network. In this remote starting method, a plurality of boot files are created and stored in an auxiliary memory in advance, and whether or not a remote start packet and an extended packet are received under an OFF state of power supply is decided. If these are received, a boot file is selected from the auxiliary memory, and the device is started in a maintenance mode. If these are not received, a boot file is selected from the auxiliary memory, and the device is started in a normal mode. According to a constitution like this, update of a system and restorative operation at the time of a system failure can not be performed with ease.

The Japanese Patent Laid Open Publication No.8-179937 discloses a device and method for switching a boot program. In this invention, boot programs are stored in a plurality of program ROMs respectively, and a CPU is started by these boot programs. According to a constitution like this, in a CPU system having a plurality of boot program fields, a boot program field can be changed and nothing more. Therefore, update of a system and restorative operation at the time of a system fault can not be performed.

The Japanese Patent Laid Open Publication No.2001-100983 discloses a control method of a computer, a computer and a recording medium. In this invention, under the state that a first OS (Operating System) is working on a computer, information for making a second OS boot is acquired under control of the first OS, and this information is written in a main memory. Then, the second OS is made to boot on the computer based on a detection of an end of the first OS. According to a constitution like this, if the first OS can not be started due to a failure of the first OS, the information for making the second OS boot can not be acquired under the control of the first OS. Therefore, there is a problem that working of the second OS becomes difficult.

The Japanese Patent Laid Open Publication No.2001-202159 discloses an electronic equipment, a data deleting method and a storage medium. The electronic equipment has a starting mode setting means and a writable nonvolatile data storage means. The starting mode setting means selects one starting mode from a plurality of starting modes, and the writable nonvolatile data storage means memorizes data corresponding to a starting mode set by the starting mode setting means. In this electronic equipment, data of partition corresponding to the starting mode selected by the starting mode setting means is eliminated by an elimination means. According to a constitution like this, an operator can eliminate the data of the partition corresponding to the selected starting mode. However, this does not make it possible to perform update of a system and restorative operation at the time of a system fault.

The Japanese Patent Laid Open Publication No.2000-295142 discloses a self-diagnostic device. This discloses only a detection of restoration of an obstacle occurring in a transmission line between one's own device and an opposite device and a decision of the restoration. According to a constitution like this, although reliability between one's own device and the opposite device can be improved, this can not be utilized for facilitating update of a system and restorative operation at the time of a system failure in an information processing device such as a server.

The Japanese Patent Laid Open Publication No.2002-123400 relates to a method and a system for transferring, a computer-readable medium and a program, and discloses a method for transferring a network boot. This discloses that a boot strap is offered and acquired via a network, and nothing more. According to a constitution like this, as mentioned above, since the network is utilized as a virtual drive, a special-purpose program and soon are needed, and a load of a device side providing a system becomes larger.

SUMMARY OF THE INVENTION

A first object of the present invention, therefore, is to provide an information processing device which can improve strength of a system and so on against a failure and can give reliability and stability of information processing.

Further, a second object of the present invention is to provide an information processing device which can perform restoration of a failure in a system and update of the system with ease.

Furthermore, a third object of the present invention is to provide a recovery method of an information processing device, which can easily perform restoration of a failure in a system and update of the system.

The other objects, features and attendant advantages of the present invention will be sufficiently understood as these become more clear by means of the following explanation.

In order to attain the first and second objects mentioned above, the information processing device of the present invention is directed to an information processing device connectable to a network including one or plural computers, and has a first storage (an HDD 16), a second storage (a flash ROM 18) and a processing unit (a CPU 12 and soon). The first storage stores first basic software to be executed by the information processing device in a case where an operating mode is a first operating mode. The second storage is provided separate from the first storage, and stores second basic software to be executed by the information processing device in a case where the operating mode is a second operating mode. The processing unit makes a boot program (42) operate and also makes the first basic software (first basic software I 17) or the second basic software (second basic software II 43) operate. The boot program (42) makes the information processing device recognize whether an operating mode is the first operating mode or the second operating mode. The processing unit makes the first basic software or the second basic software operate based on the recognition of operating mode. Further, the second basic software includes software which makes the information processing device read-in a data via the network.

Each of the first and second operating modes is a mode performing independent operation. For example, if the first operating mode is a mode representative of normal operation, the second operating mode is a mode representative of operation, such as restorative operation at the time of a failure in a system, update of the system and so on, except the normal operation. The contents of operation in each mode are optional. In addition, each of the first and second storage is an independent storage. The first storage is constituted as a storage which stores the first basic software working under the first operating mode, and the second storage is constituted as a storage which stores the second basic software working under the second operating mode. It is enough if these storages have independent constitution each other, and its form as a memory is optional. Furthermore, the boot program and the second basic software may also be stored in the same storage, or may also be stored in a different storage.

At the time of starting, the processing unit makes the boot program operate, and recognizes via the operation of boot program whether an operating mode is the first operating mode of the first storage or the second operating mode of the second storage. As a result of the recognition of operating mode, either the first operating mode or the second operating mode is selected. And, under the first operating mode, the operation of the first basic software of the first storage is performed, and an OS (Operating System) is made to operate as a normal operation, for example. On the other hand, under the second operating mode, the second basic software of the second storage is made to operate, and operation of restoration, update and so on of the first basic software or the system is performed, for example.

As described above, by setting the first and second operating modes, operation of the first basic software or the second basic software can be performed with ease. By this, the restoration and the update of the first basic software and the system can be easily quickly performed. Furthermore, the first storage storing the first basic software and the second storage storing the second basic software are separately independently provided. Because of this, for example, even if a failure is occurring in the first basic software or the first storage, it is possible to make the second basic software operate by making the boot program start from the second storage or another storage independent of the first storage. In the operation of the second basic software, execution of various processes is possible without starting the first basic software. Hence, processing including the restoration and the update of the first basic software can be quickly performed. In particular, update and so on of a basic portion in the first basic software can also be performed with ease. Therefore, according to this information processing device, since the first basic software and the second basic software are separately independently stored in the first and second storages which can be made to independently operate, strength of the information processing device or the system against a failure may be improved, and also simplification, reliability and stability of information processing may be given.

As described above in detail, in this information processing device, the first basic software is stored in the first storage, and the second basic software is stored in the second storage. And, the boot program is started and whether an operating mode is the first operating mode or the second operating mode is recognized. The first basic software is made to operate in a case where the operating mode is the first operating mode, and the second basic software is made to operate in a case where the operating mode is the second operating mode, based on the recognition of operating mode. Because of this, the first or second basic software stored in the first storage and the second storage separate from the first storage is made to operate based on the recognition of the boot program, and thereby the operation of the restoration, the update and so on of the first basic software and the system developed in the first storage can be performed with ease through the second basic software. By this, the strength of the whole device, the system or the first basic software against a failure may be improved, and the reliability and the stability of the information processing may be given.

In order to attain the first or second object mentioned above, the second basic software may also be constituted so as to include software which makes the information processing device give an IP address according to a requirement of a client via the network. That is, by the second basic software including software like this, under the operation of the second basic software, an IP address is given in accordance with a requirement of a client through a connected network, and giving and receiving of desired information become possible. By this, under the operation of the second basic software, the information processing device copes with the requirement from the client through the connected network and gives the IP address, and quickness of the information processing including the giving and receiving of desired information may become possible.

In order to attain the first or second object mentioned above, the second basic software may also be constituted so as to include software for restoration and/or update of the first basic software or the system developed in the first storage or for a device diagnosis. That is, if the second basic software is started under the second operating mode, information processing separate from the first basic software becomes possible. Because of this, the information processing device can perform the restoration and/or the update of the first basic software or the system developed in the first storage, or can perform the device diagnosis, without connecting with the first basic software. When a failure is occurring in the first basic software, the information processing device starts the second basic software in case of the second operating mode. And, for example, the information processing device receives an offer of software through the network, and can perform restorative processing of the first basic software. In addition, in case that a failure is not in existence, the information device receives the offer of the software via the network and can perform update processing of the first basic software. Furthermore, if the second basic software is started and the device diagnosis of the HDD and so on is performed, whether or not the restoration of the system is possible and whether or not replacement or repair of the first storage is necessary can be recognized with ease. Consequently, an operator can be released from useless processing. By this, the restoration or the update of the first basic software and/or the system can be performed, or the diagnosis of the first storage and/or the whole device can be performed, from the operation of the second basic software stored in the second storage which is set separate from the first storage storing the first basic software and the system, based on the recognition of the operating mode at the time of starting of the boot program. Because of this, the strength of the system and so on against a failure can be improved, and the reliability and the stability of the information processing may be given.

Furthermore, in order to attain the third object mentioned above, the recovery method of the information processing device according to the present invention is directed to a recovery method of an information processing device connectable to a network including one or plural computers, and includes the following processing. In first processing, in a case where a first operating mode is selected from the first operating mode and a second operating mode at the time of starting of a boot program, first basic software stored in a first storage is made to operate. In second processing, in a case where the second operating mode is selected, second basic software stored in a second storage is made to operate, and a search for an opposite device from the computers on the network is performed. And, in third processing, the information processing device is connected to the opposite device, receives an offer of software from the opposite device, and performs restoration or update of the first basic software or a system developed in the first storage.

In the recovery method of the information processing device, whether a selected operating mode is the first operating mode or the second operating mode is recognized at the time of starting of a boot program. At this, as described in the information processing device, each of the first and second operating modes is a mode performing independent operation. For example, if the first operating mode is a mode representative of normal operation, the second operating mode is a mode representative of operation, such as restorative operation at the time of a failure in the system, update of the system and so on, except the normal operation. The contents of operation in each mode are optional. Under the first operating mode, the first basic software stored in the first storage is made to operate, and, under the second operating mode, the second basic software stored in the second storage is made to operate. In this case, the boot program may also be stored in the second storage storing the second basic software, or may also be stored in another storage.

Therefore, the first basic software is started from the first storage in a case where the first operating mode is selected, and the second basic software is started from the second storage in a case where the second operating mode is selected. In case that the second basic software operates, the search for the opposite device from the computers on the network is performed. And, the information processing device is connected to the opposite device located by the search of the information processing device. In this case, the opposite device is to function as a server, and the information processing device is to function as a client. That is, software is offered to the client namely the information processing device from the opposite device. The information processing device performs the restoration or the update of the first basic software and the system existing in the first storage by means of the offered software.

Therefore, according to a recovery method like this, the restoration at the time of a failure and the update of the first basic software or the system developed in the first storage can be performed with ease by starting of the second basic software of the second storage which is a storage different from the first storage. Because of this, it is possible to improve reliability, stability and safety of information processing in the information processing device. Furthermore, since the update of the first basic software can be performed by using the second basic software separate from the first basic software, restoration and update of its basic portion can be easily quickly performed.

Consequently, according to the recovery method of the information processing device of the present invention, the selected operating mode is recognized by the operation of the boot program. And, in case of a failure, the second basic software is made to operate based on the recognition of selected operating mode, and the restoration or the update of the first basic software and/or the system developed in the first storage can be performed by way of communication with the opposite device. By this, simplification of its recovery may be given. As a result, strength of the system and so on against a failure may be improved, and contribution to reliability and stability of information processing may be given.

In order to attain the third object mentioned above, in the recovery method of the information processing device according to the present invention, the second basic software may also be constituted so as to include processing that specifies an opposite device for the information processing device from the computers on the network, and processing that receives an offer of software from the specified opposite device and performs the restoration or the update of the first basic software or the system developed in the first storage. That is, by specifying an opposite device located from the computers on the network, the information processing device can receive the offer of desired software from the opposite device. By using software like this, the restoration or the update of the first basic software and/or the system can be performed on the spot. Hence, by specifying the opposite device from the computers on the network and by offering the desired software, the restoration or the update of the first basic software and/or the system can be performed on the spot, and the strength of the system and so on against a failure can be improved. Because of this, the contribution to the reliability and the stability of the information processing may be given.

BRIEF DESCRIPTION OF THE DRAWINGS

The foregoing and other objects, features and attendant advantages of the present invention will be appreciated as the same become better understood by means of the following description and accompanying drawings wherein.

DETAILED DESCRIPTION OF THE PREFERRED EMBODIMENTS

Figure 1:
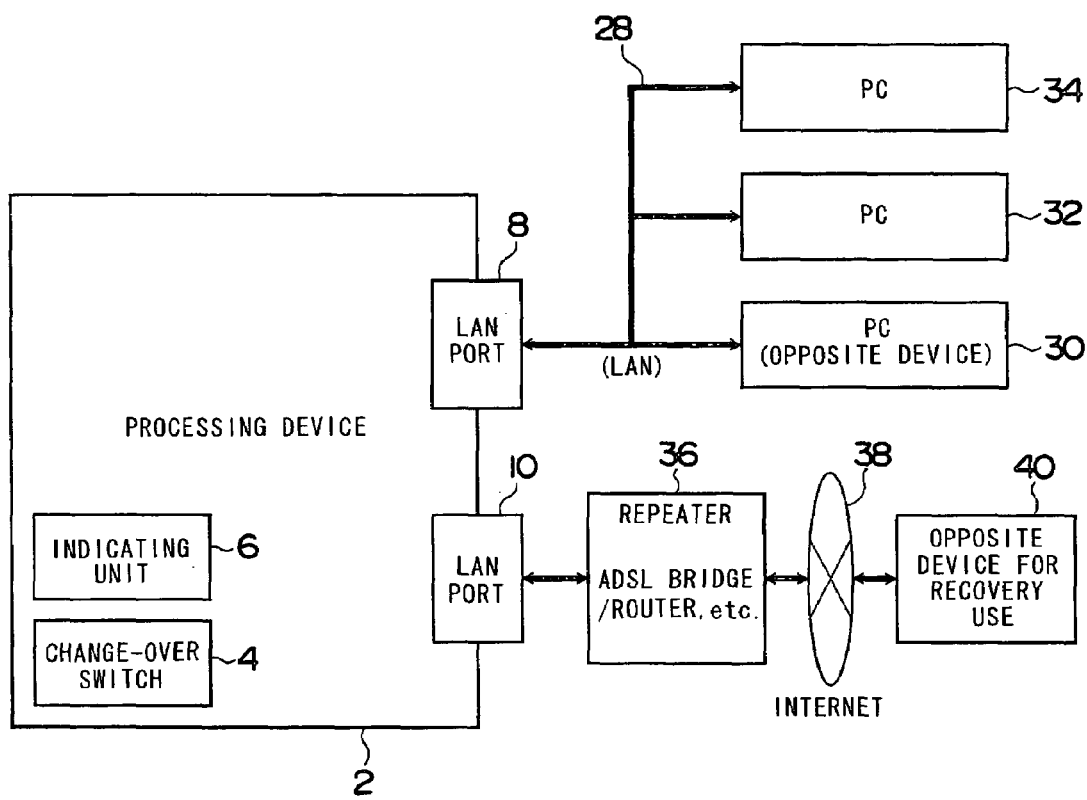
FIG. 1 is a block diagram showing an embodiment of an information processing device according to the present invention.

FIG. 1 shows an embodiment of an information processing device according to the present invention. In this embodiment, the information processing device is constituted as a server offering information to a client. The processing device 2 as a server is constituted by a computer. However, the processing device 2 is different from an ordinary personal computer (PC), and is not equipped with an input unit such as a keyboard and an information display unit such as a CRT (Cathode Ray Tube) display and a liquid crystal display. The processing device 2 has a necessary constitution for realizing functions of the server. That is, the processing device 2 is equipped with the necessary constitution in order to constitute a network with an external device of a personal computer and so on, perform communication with a client selected from the network, and execute a desired information processing.

Figure 2:
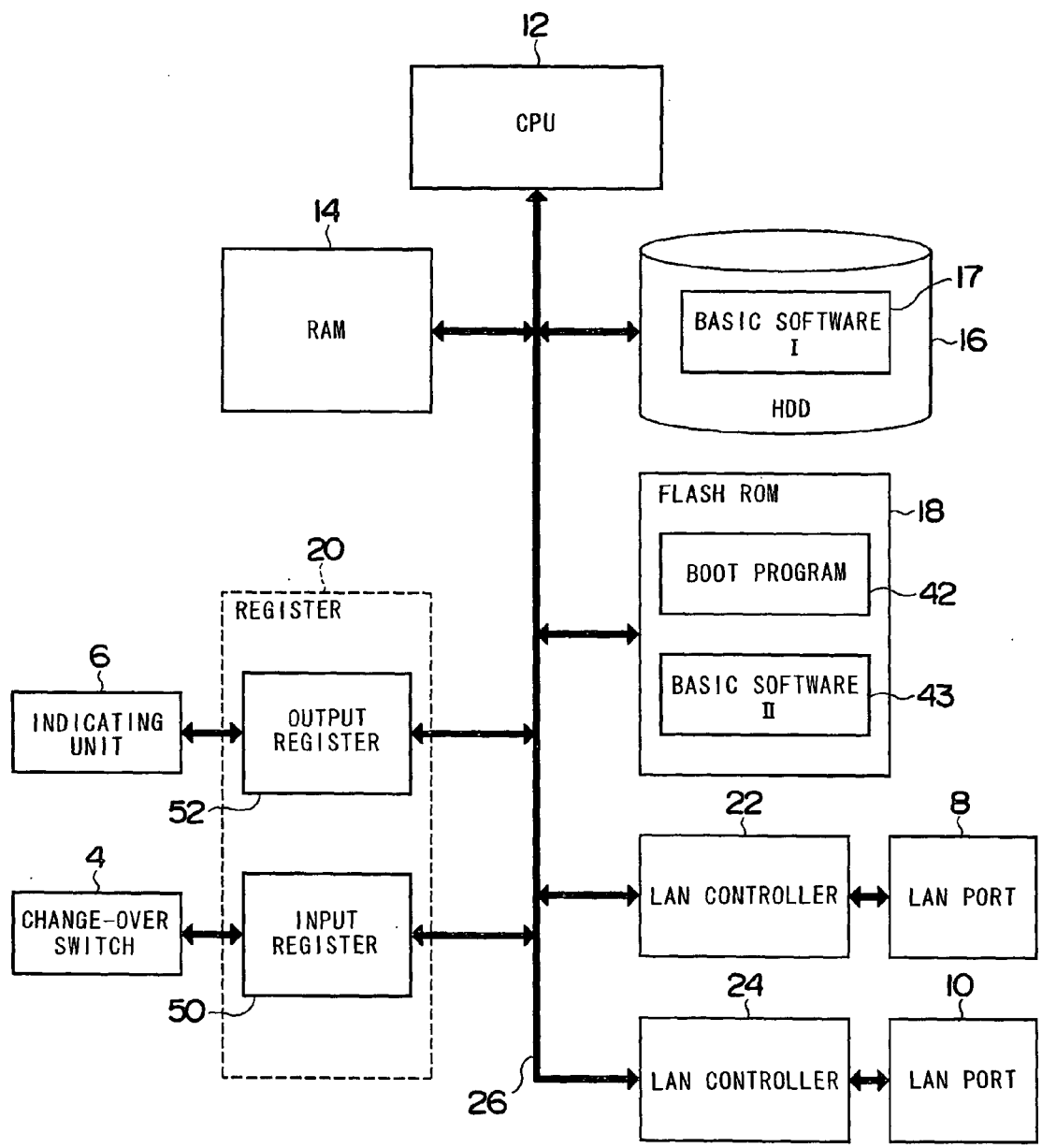
FIG. 2 is a block diagram showing hardware of the processing device.

In this embodiment, the processing device 2 has a change-over switch 4, an indicating unit 6, such as an indicator, which shows simply an operating state like an operating mode and warning, and a plurality of LAN (Local Area Network) ports 8 and 10 as connection parts which are used in a connection with an external device. Furthermore, for example, the processing device 2 is equipped with hardware constitution shown in FIG. 2. That is, the processing device 2 has a CPU (Central Processing Unit) 12 as a processing unit, a RAM (Random Access Memory) 14, an HDD (Hard Disk Drive) 16 as a first storage, a flash ROM (Read Only Memory) 18 as a second storage port, a register 20, and LAN controllers 22 and 24. These are connected via a bus 26.

Figure 3:
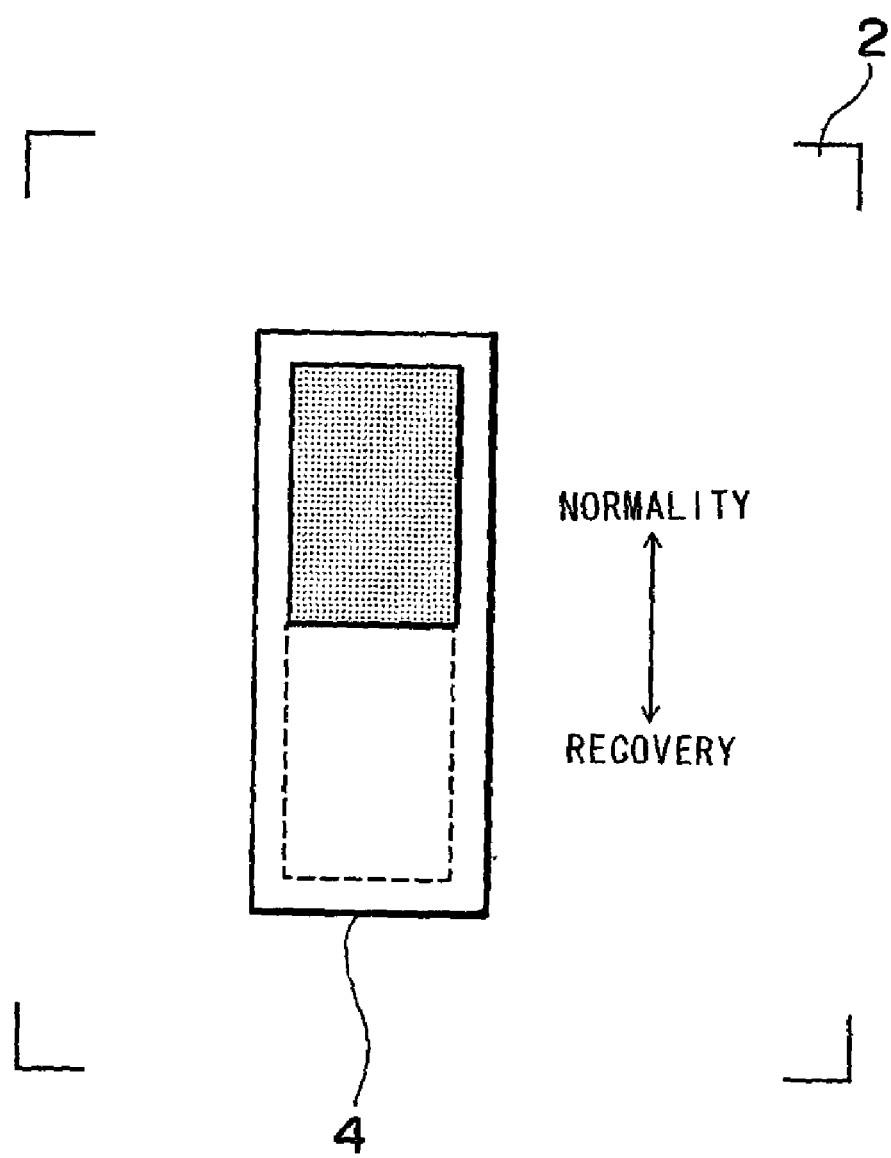
FIG. 3 is a plane view showing an example of a change-over switch in the processing device.

In this processing device 2, the change-over switch 4 constitutes a part or the whole of a mode selection part which selects an optional operating mode from a plurality of operating modes set in advance. For example, as the operating modes, first and second operating modes are previously given. On a function, in case that the mode selection part is constituted by hardware or software of the side of the processing device 2, the change-over switch 4 becomes a designation part designating an operating mode which should be selected. In that case, the change-over switch 4 is to constitute a part of the mode selection part. As shown in FIG. 3 as an example, the change-over switch 4 is provided on a body of the processing device 2, and can be constituted by a slide switch which is changed over to a normal mode as the first operating mode or a recovery mode as the second operating mode.

The indicating unit 6 is an indicator which shows an operating mode switched by the change-over switch 4 and warning including abnormality of a system and the HDD 16. For example, the indicating unit 6 is constituted by a plurality of LEDs, and shows the operating state and the warning by a luminous form, such as luminous color of driven LED and the number of driven LEDs.

The LAN port 8 is a port for an internal network. A plurality of PCs (Personal Computer) 30, 32 and 34 are connected to the LAN port 8 via a LAN cable 28. A local area network (LAN) is constituted by the processing device 2, each of the PCs 30, 32 and 34, and the LAN cable 28. In this embodiment, the PC 30 constitutes an opposite device of the processing device 2, and has a CD-ROM drive storing a recovery data. That is, the processing device 2 constitutes a server under the normal mode, and, under the recovery mode, the processing device 2 becomes a client toward the PC 30 namely the opposite device. And, the processing device 2 is to receive an offer of the recovery data including software from a side of the specified PC 30.

The LAN port 10 is a port for an external network. The LAN port 10 is connected to the internet 38 via a repeater 36, such as an ADSL (Asymmetric Digital Subscriber Line) bridge and a router, and an opposite device 40 for recovery use is connected to the LAN port 10 via the internet 38. That is, under the recovery mode, the processing device 2 constituting the server under the normal mode becomes a client toward the opposite device 40. And, the processing device 2 is to receive an offer of the recovery data including software from the opposite device 40. In this case, the repeater 36 constitutes a DHCP (Dynamic Host Configuration Protocol) server.

Figure 4:
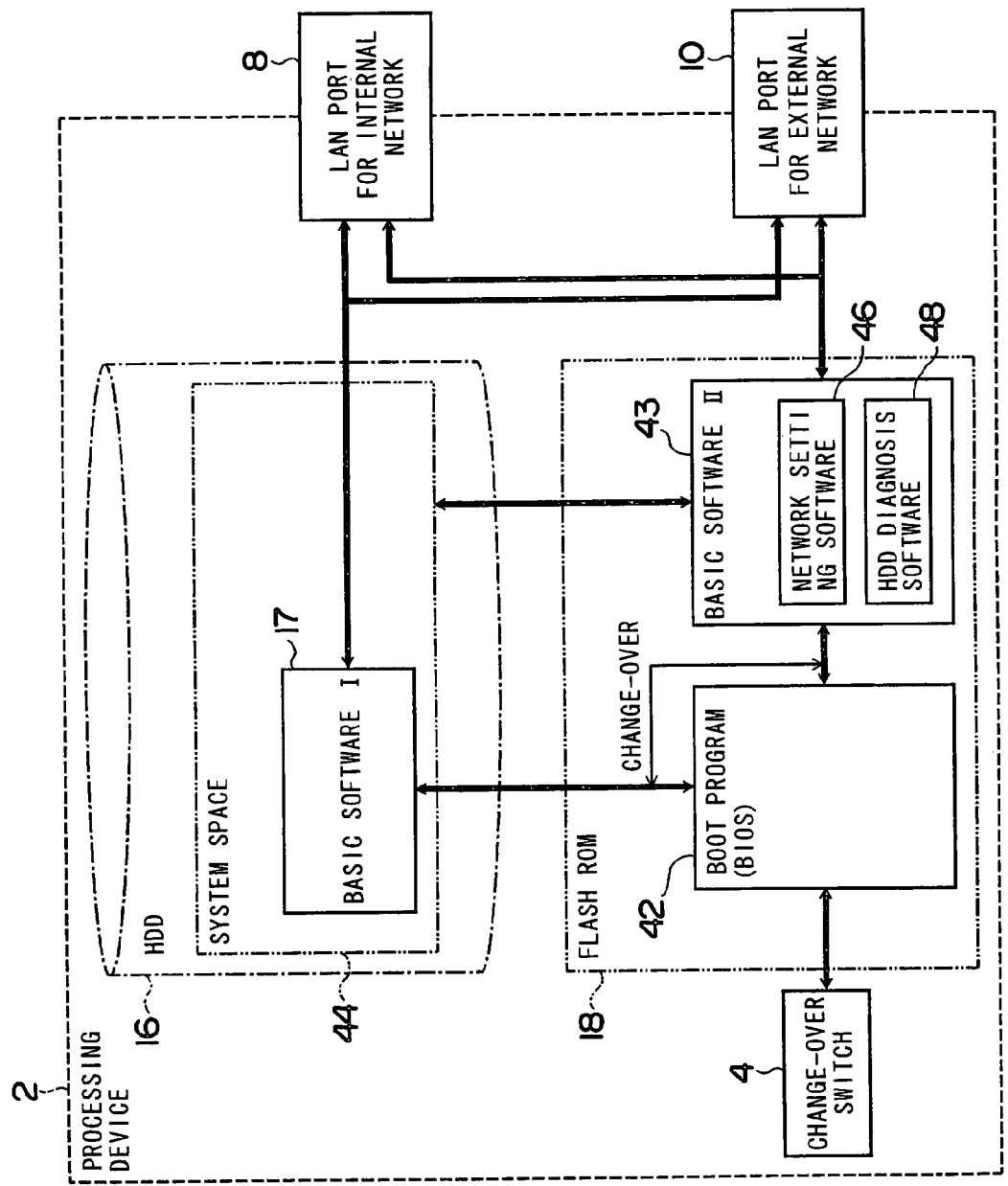
FIG. 4 is a drawing showing an operating mechanism in the processing device.

The CPU 12 is constituted by a microprocessor, for example. The CPU 12 takes charge of various information processes including an interpretation and execution of instruction, a temporary memory of data, input-output control, change-over control of the operating mode, indicating control including the indication of operating modes, and so on. That is, at the time of starting of a boot program {BIOS (Basic Input Output System)} 42 (FIG. 2), the CPU 12 constitutes a change-over part or a selection part selecting a first basic software I or a second basic software II which should be started, together with a mode selection program included in the boot program 42. The RAM 14 is a data memory which memorizes temporally a data in the middle of processing. The HDD 16 constituting the first storage stores the first basic software I 17 which is started in case of a normal operation as the first operating mode. This basic software I 17 is an OS (Operating System), for example. As shown in FIG. 4 as an example, the basic software I 17 is processed by a system developed in the HDD 16. That is, the basic software I 17 is processed in a system space 44. The flash ROM 18 constitutes the second storage which is independently constituted separate from the first storage. The flash ROM 18 stores the boot program 42 and the second basic software II 43.

The boot program 42 is a program for starting the first basic software I 17 or the second basic software II 43. In this embodiment, the first or second operating modes selected by the change-over switch 4 is recognized by means of the boot program 42, and software which makes either the first basic software I 17 or the second basic software II 43 operate selectively is included. The second basic software II 43, as shown in FIG. 4 as an example, includes software of network setting software 46, HDD diagnosis software 48 and so on. The network setting software 46 includes software which makes the processing device 2 read-in data via the network, and software which makes the processing device 2 grant an IP address in accordance with a requirement of a client via the network, for example. Furthermore, the basic software II 43 includes processing which specifies an opposite device for the processing device 2 from computers on the network, processing which receives an offer of software from the specified opposite device and performs restoration or update of the first basic software I 17 or the system developed in the system space 44 of the HDD 16 namely the first storage, and so on. The HDD diagnosis software 48 includes software for diagnosing whether or not a failure is occurring in the HDD 16, and so on.

In the processing device 2, the register 20 is an input-output part of data, and includes an input register 50 and an output register 52. The input register 50 is provided at the side of the change-over switch 4, and the output register 52 is provided at the side of the indicating unit 6. The input register 50 holds an operating mode data set by the change-over switch 4, and the output register 52 holds an indication data which should be indicated in the indicating unit 6. Therefore, the register 20 is the input-output part of data, and also constitutes a holding part of a change-over data and the indication data. The LAN controller 22 is a device which gives and receives a data between the bus 26 and the LAN port 8 for the internal network. The LAN controller 24 is a device which gives and receives a data between the bus 26 and the LAN port 10 for the external network.

The above constitution will be summarized as follows. As shown in FIG. 4, in the processing device 2, a change-over mechanism of the operating mode is constituted by the change-over switch 4 and the boot program 42. And, the normal operating mode is set as the first operating mode of the operating modes which are selectively switched, and the recovery mode is set as the second operating mode of the operating modes. The first basic software I 17 to be started in case of the normal operating mode operates in the system space 44 developed in the HDD 16, and the second basic software II 43 operating under the recovery mode is stored in the flash ROM 18 in which the boot program 42 is stored.

Therefore, in the normal operating mode, if a starting switch, such as a power supply switch, not shown in the drawings is made ON, the boot program 42 is started. When the change-over switch 4 is set to the normal operating mode as shown in FIG. 3, the first basic software I (ex. an OS) 17 of the HDD 16 operates, and normal processing is performed in the system space 44.

Contrary to this, in a case where the change-over switch 4 is set to the recovery mode as shown by a broken line in FIG. 3, the recovery mode namely the second operating mode is recognized from the starting of the boot program 42, and the second basic software II 43 is started based on the recognition of the recovery mode. Then, in this embodiment, the processing of the network setting software 46, the HDD diagnosis software 48 and so on is executed.

Figure 5:
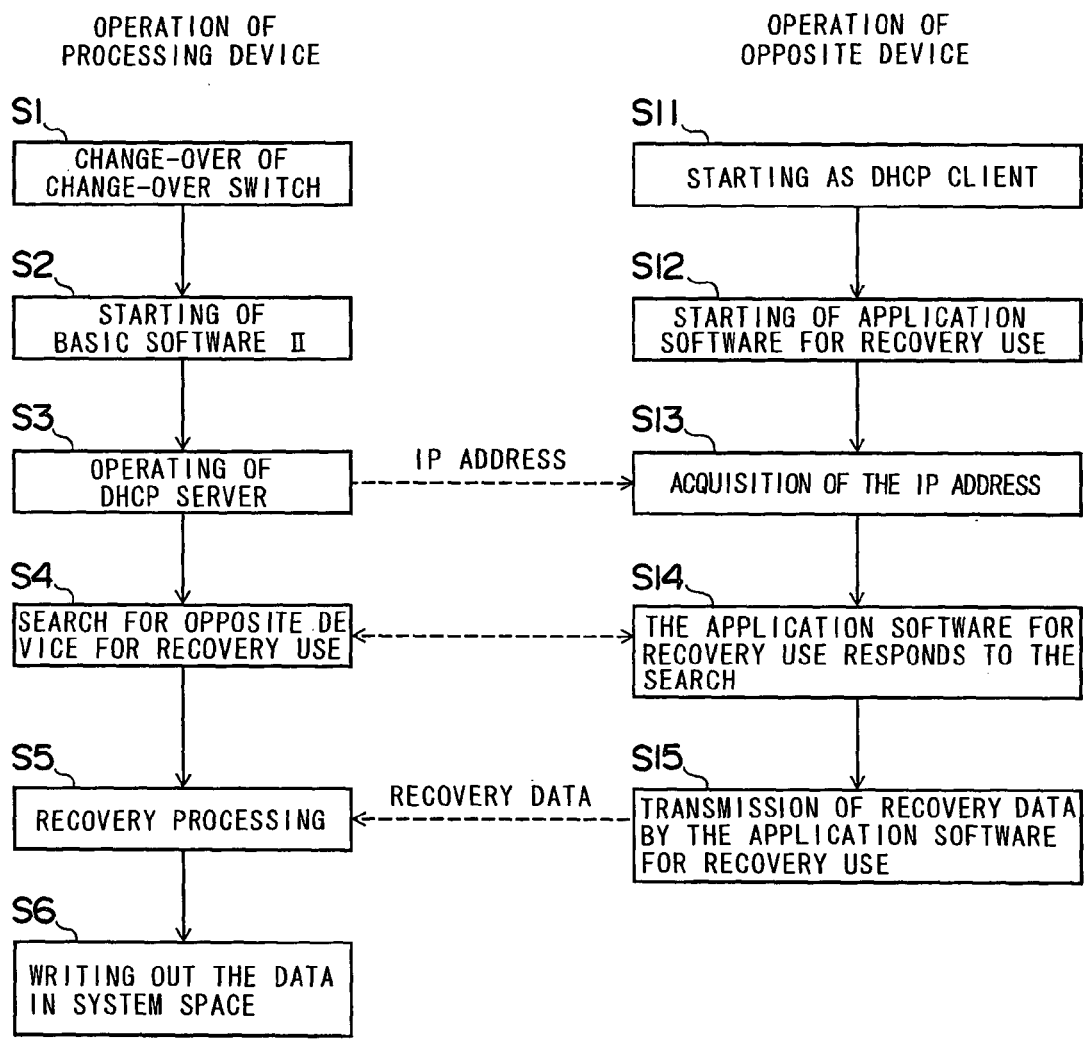
FIG. 5 is a flow diagram showing an outline of a recovery method in the embodiment of the information processing device according to the present invention.

FIG. 5 shows an outline of a recovery method of the information processing device in the embodiment of the present invention. In this recovery method, steps S1, S2, S3, S4, S5 and S6 are processing in the side of the processing device 2, and steps S11, S12, S13, S14 and S15 are processing in the side of the opposite device 40.

If the boot program 42 is started, the processing proceeds to the step S1, change-over of the change-over switch 4 is confirmed as recognition processing of the operating mode, and selection of the operating mode is performed upon the opportunity of the change-over of the switch 4. When the change-over switch 4 is at the recovery mode (the state shown by the broken line in FIG. 3), the processing proceeds to the step S2, and the second basic software II 43 is made to start. At this time, the network setting software 46 of the second basic software II 43 is stated, and network setting processing is executed. Therefore, at the step S3, the DHCP server is made to operate. In the hardware constitution shown in FIG. 1, the repeater 36 constitutes the DHCP server. The processing proceeds to the step S4 after issuing an IP (Internet Protocol) address, and a search for an opposite device for recovery use is performed. At the following step S5, the side of the processing device 2 receives a recovery data from the opposite device located by the search, and recovery processing is performed. Then, the recovery data is written-out in the system space 44 at the step S6, and restoration or update of the first basic software I 17 or the system developed in the HDD 16 is performed as the recovery processing.

On the other hand, in connection with the processing of the side of the processing device 2, in the opposite device side the opposite device is started as a DHCP client at the step S11, and application software for recovery use is started at the step S12. At the following step S13, acquisition of the IP address issued from the processing device 2 at the step S3 is performed. As a result of the acquisition of the IP address, the opposite device shifts to a server from a client. Consequently, at the step S14, the application software for recovery use, which has been started on the opposite device, responds to the search (the step S4) for the opposite device for recovery use from the side of the processing device 2. By this, connection and communication between the opposite device as a server and the processing device 2 as a client are established. As a result of this, at the step S15, transmission of the recovery data is performed by the application software for recovery use of the opposite device side, and the recovery data is given to the processing device 2. By this, the recovery processing (the step S5), such as restoration or update of the first basic software I 17, is executed by using the recovery data.

Figure 6:
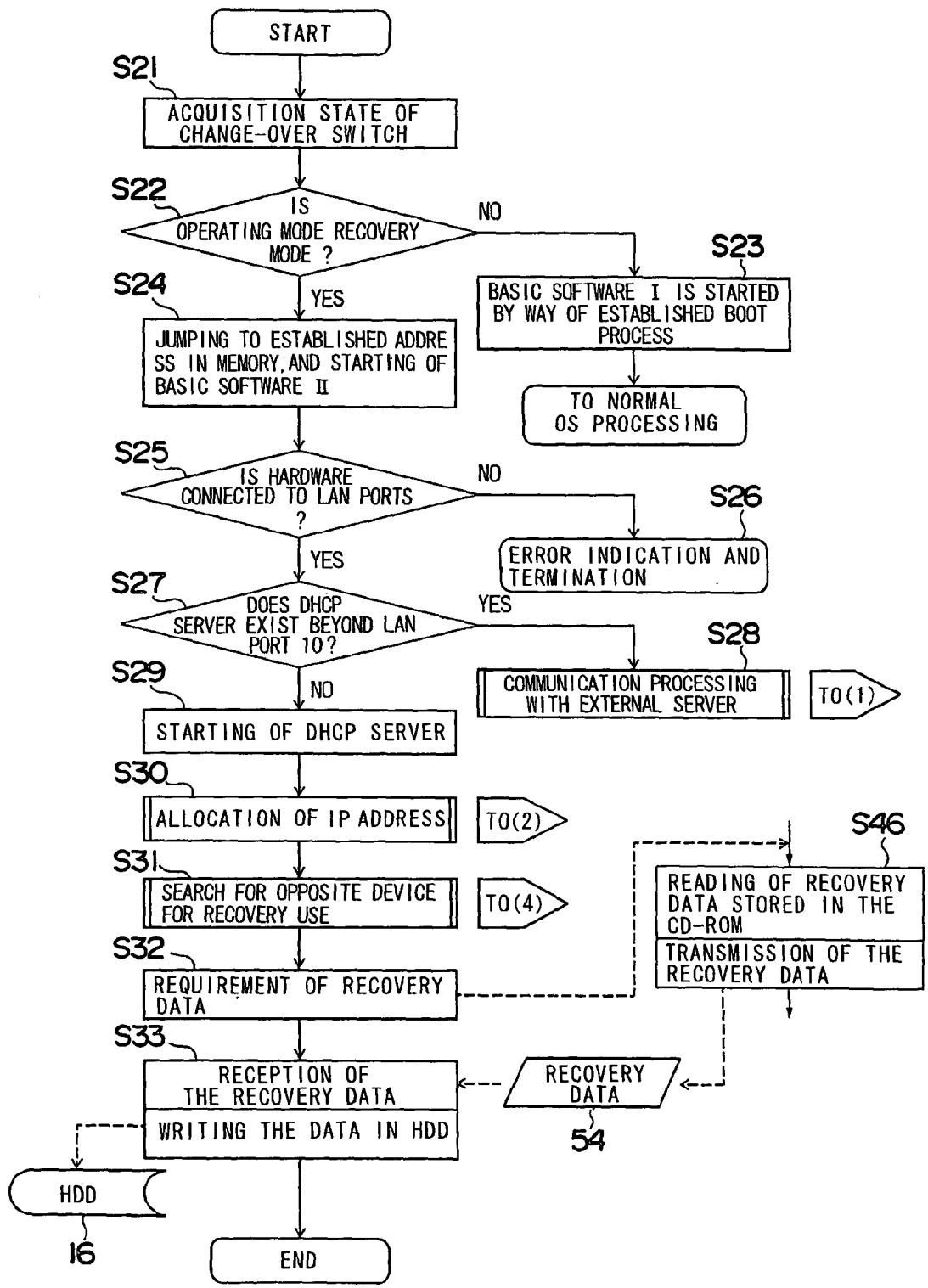
FIG. 6 is a flow diagram showing processing of a side of the processing device in the recovery method.
Figure 7:
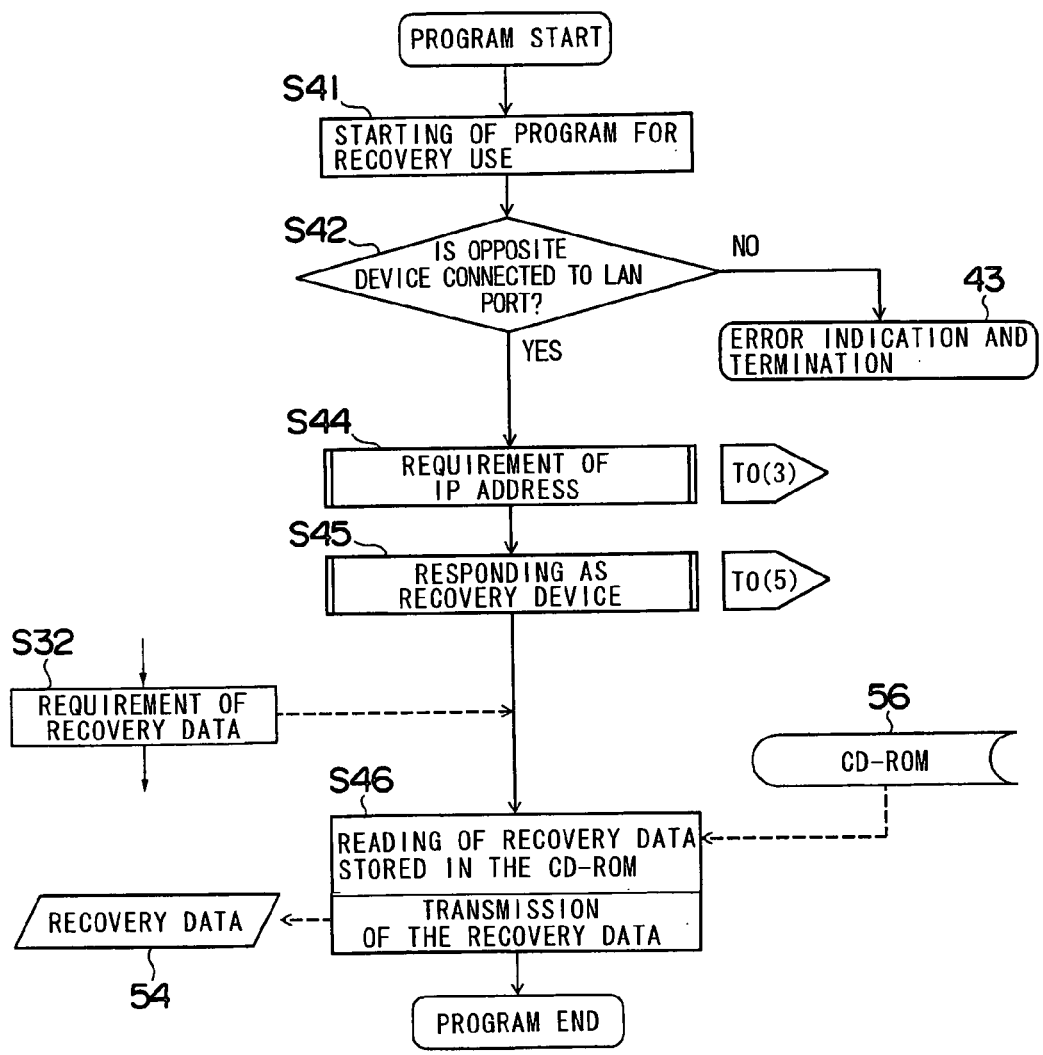
FIG. 7 is a flow diagram showing processing of a side of an opposite device in the recovery method.

The recovery processing mentioned above is further explained by referring to flow diagrams of FIG. 6 and FIG. 7. FIG. 6 shows detailed processing in the side of the processing device 2, and FIG. 7 shows detailed processing in the side of the opposite device.

In the processing device 2, by the starting of the boot program 42, a change-over state of the change-over switch 4 is acquired from the input register 50 at a step S21, and whether or not the operating mode is the recovery mode is recognized at a step S22. If the operating mode is not the recovery mode, the processing device 2 enters a step S23 and becomes the normal operating mode. That is, the first basic software I 17 in the HDD 16 is started by way of an established boot process, and normal OS processing is to be executed.

If the recovery mode is recognized at the step S22, the processing device 2 enters a step S24, jumps to an established address in the memory, and starts the second basic software II 43 which is stored together with the boot program 42 in the flash ROM 18. That is, the processing device 2 shifts to the recovery processing.

At the following step S25, whether or not a connection of hardware exists in the LAN ports 8 and 10 is decided. If the connection of the hardware does not exist in the LAN ports 8 and 10, the processing device 2 enters a step S26 since it is impossible to perform the recovery processing. At the step S26, error indication is performed in the indicating unit 6, and this program is terminated. In this case, the error indication may also urge an operator to perform the connection of necessary hardware.

After the connection is confirmed, at a step S27, whether or not the DHCP server exists beyond the LAN port 10 is confirmed. In a case where the DHCP server exists, the processing device 2 enters a step S28 and is to perform communication processing with an external server. This communication processing is processing shown in FIG. 8, for example.

In this embodiment, since the repeater 36 connected to the LAN port 10 is constituted by the ADSL bridge, the router or the like, the DHCP server is in existence beyond the LAN port 10 as a result of this constitution. Therefore, at the step S28, the communication processing with the external server is performed. In this communication processing, in a case where the opposite device 40 for recovery use is not found via the internet 38, the DHCP server of the processing device 2 is started at a step S29. After that, the processing device 2 enters a step S30 and performs IP address allocation processing. This IP address allocation processing is processing shown in FIG. 9, for example.

After the IP address allocation processing, the processing device 2 enters a step S31 and makes a search for a device for recovery use. The search for the device for recovery use is processing shown in FIG. 10, for example. As a result of this, if the opposite device 30 for recovery use is located by the search and is specified, the processing device 2 enters a step S32, and a requirement of a recovery data is performed from the side of the processing unit 2. As a result of this requirement, the recovery data 54 is transmitted to the processing device 2 through processing (a step S46) of the opposite device side. The processing device 2 receives the recovery data 54 at a step S33, writes that data in the HDD 16, and completes the recovery processing. As a result of this, the restoration or the update of the first basic software I 17 is performed.

In connection with the processing of the processing device 2 described above, the side of the opposite device performs processing shown in FIG. 7. That is, a program for recovery use is started at a step S41. At the following step S42, whether or not the PC 30 namely the opposite device is connected to the LAN port 8 is decided. If the opposite device is not connected, processing of a step S43 is performed since the recovery processing is impossible. At the step S43, error indication is performed in the indicating unit 6 and the processing is terminated.

If the PC 30 namely the opposite device is connected to the LAN port 8, processing of a step S44 is performed, and a requirement of an IP address is performed. This requirement of the IP address is executed by IP address requirement processing shown in FIG. 9, for example. If the IP address is issued, processing of a step S45 is performed, and the specified PC 30 responds as a recovery device. This response processing is executed in response processing as the recovery device in FIG. 10, for example. At this time, the PC 30 functions as a server, and the processing device 2 functions as a client. And, communication between the PC 30 as a server and the processing device 2 as a client is formed.

As a result of this response, the side of the processing device 2 shifts to the recovery processing, and the requirement of the recovery data 54 is given to the side of the PC 30. Because of this, the recovery data 54 is given to the processing device 2 from the PC 30. In this embodiment, a CD-ROM 56 is set in a CD-ROM drive of the PC 30, reading of the recovery data 54 stored in the CD-ROM 56 is performed at a step S46, and then transmission of the recovery data 54 is performed. This recovery data 54 is used in the recovery processing of the processing device 2.

Figure 8:
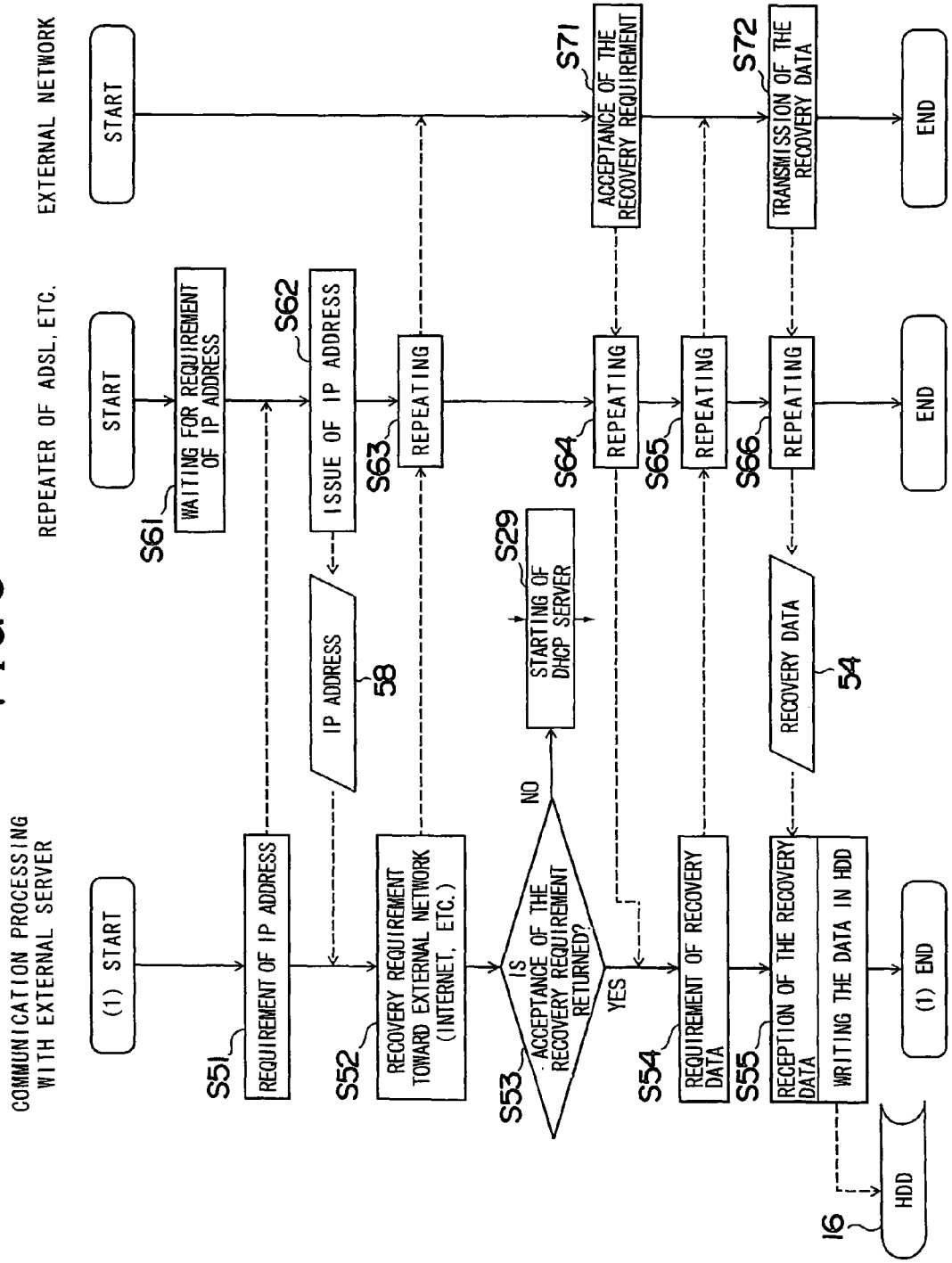
FIG. 8 is a flow diagram showing recovery processing using a server on an external network.

In a recovery processing like this, FIG. 8 shows an example of processing routine of communication processing with the opposite device 40 for recovery use on the external network, giving and receiving of the recovery data 54, and so on. In this recovery processing, processing of steps S51, S52, S53, S54 and S55 shows the communication processing between the processing device 2 and an external server, processing of steps S61, S62, S63, S64, S65 and S66 shows processing in the repeater 36 of the ADSL bridge or the like, and processing of steps S71 and S72 shows processing on the external network.

The communication processing with the external server is processing which is performed in case that the DHCP server exists beyond the LAN port 10 at the processing of the step S27 of the recovery processing shown in FIG. 6. Therefore, in this case, a requirement of an IP address is performed to the repeater 36 from the processing device 2 at the S51, and a recovery requirement is performed toward the external network (the internet and so on) at the step S52. At the following step S53, whether or not acceptance of the recovery requirement is returned is decided. If the acceptance of the recovery requirement is not returned, the processing of the step S29 shown in FIG. 6 is performed. On the other hand, if the acceptance of the recovery requirement is returned, processing of the step S54 is performed. At the step S54, a requirement of the recovery data 54 is performed. At the following step S55, the recovery data 54 is received based on the requirement, and that data is written in the HDD 16. By this, the restoration and/or the update of the first basic software I 17 of the side of the HDD 16 is performed. That is, the recovery processing is performed through the external server the same as the processing shown in FIG. 6 and FIG. 7 using the PC 30 constituting the LAN as a server.

Normally, the repeater 36 of the ADSL bridge and so on enters the step S61 after power source is impressed. In order to cope with the recovery processing to be performed through the external server, if the requirement of an IP address is given from the processing device 2 at the step S51, the repeater 36 enters the step S62 and issues an IP address 58. The IP address 58 is given to the side of the processing device 2. As a result of this, communication between the processing device 2 and the opposite device 40 for recovery use connected to the internet 38 namely the external network is established. Then, at the steps S63 through S66, repeating processing for giving and receiving data between the processing device 2 and the opposite device 40 for recovery use is performed.

If the recovery requirement is performed from the processing device 2 at the step S52, the recovery requirement is transmitted to the opposite device 40 for recovery use through the internet 38 namely the external network via the repeater 36, and the recovery requirement is accepted at the step S71. The result of the acceptance is transmitted to the processing device 2 through the repeater 36, and, upon this opportunity, the recovery data requirement from the processing device 2 at the step S54 is transmitted to the opposite device 40 for recovery use via the repeater 36. In the opposite device 40 for recovery use which receives the recovery data requirement, transmission of the recovery data 54 is performed at the step S72, and the recovery data 54 is transmitted to the processing device 2. In the processing device 2, the recovery data is written in the HDD 16. By way of a chain of processes like this, the communication processing between the processing device 2 and the external server is completed.

Figure 9:
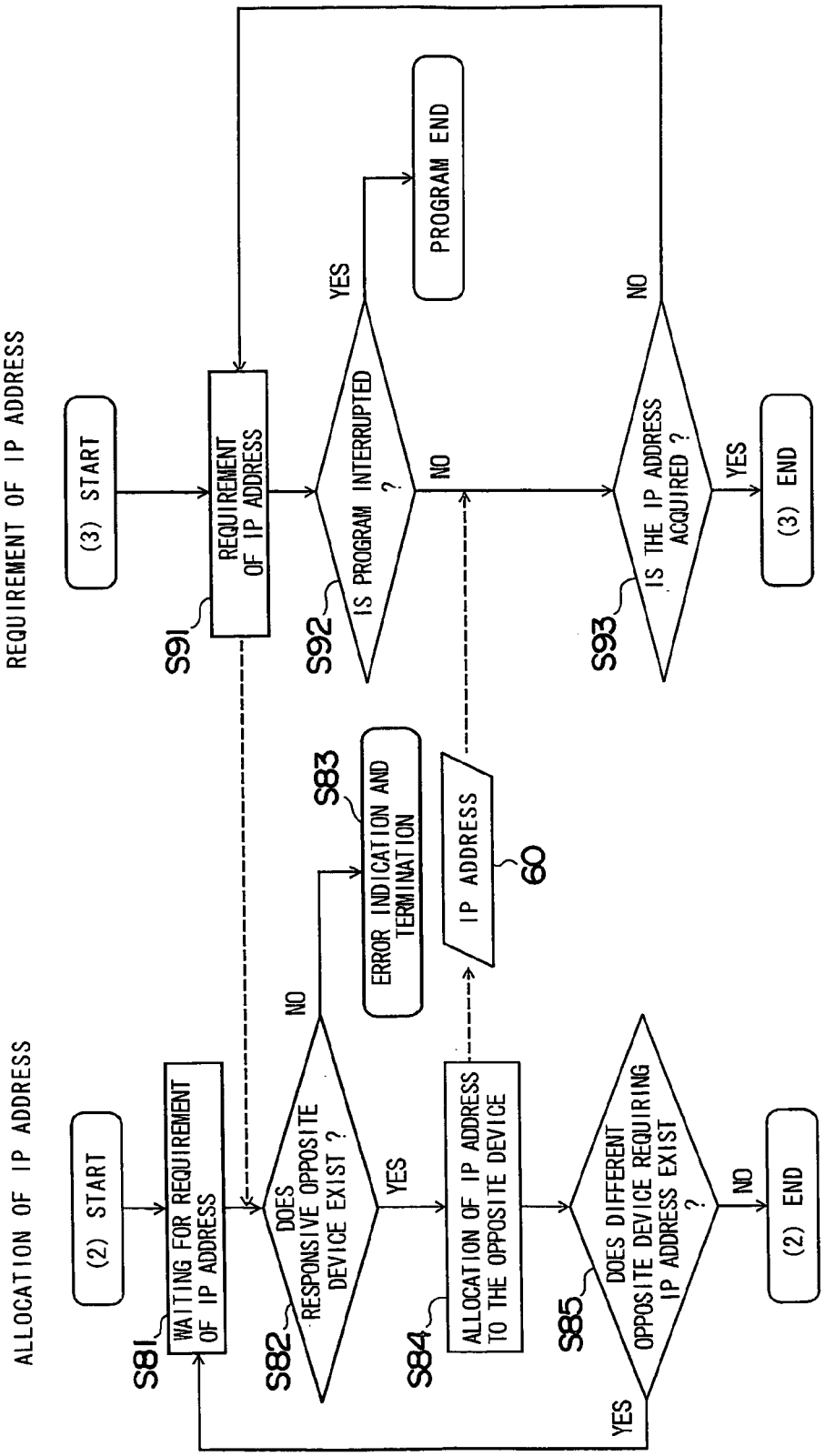
FIG. 9 is a flow diagram showing IP address allocation processing and IP address requirement processing in the recovery processing.

FIG. 9 shows an IP address allocation processing routine and an IP address requirement processing routine in the recovery processing. Processing of steps S81, S82, S83, S84 and S85 is the IP address allocation processing routine at the step S30 in the processing shown in FIG. 6, and processing of steps S91, S92 and S93 is the IP address requirement processing routine at the step S44 in the processing of the opposite device side shown in FIG. 7.

The IP address allocation processing is started from a waiting state for a requirement of an IP address at the step S81. At the following step S82, whether or not a responsive opposite device namely the PC 30 is in existence is decided. If the responsive opposite device is not in existence, since it is impossible to perform the recovery processing, the processing device 2 enters the step S83 and terminates the processing after indicating an error in the indicating unit 6.

On the other hand, if the responsive opposite device (PC 30) is in existence, the processing device 2 enters the step S84. At the step S84, an IP address is allocated to the opposite device, and that IP address is transmitted to the requirement side of the IP address. At the following step S85, whether or not a different opposite device requiring an IP address exists is decided. If the different opposite device requiring the IP address exists, the processing device 2 returns to the step S81, and the processing of the step S82 to the step S85 is performed. If the different opposite device requiring the IP address does not exist, the IP address allocation processing is terminated.

In connection with IP address allocation processing like this, the following processing is performed in the IP address requirement processing in the side of the opposite device. At the step S91, the requirement of the IP address is performed to the processing device 2. At the following step S92, proceeding of a program is watched in order to secure reliability of an operation, and whether or not the program is interrupted is decided. In a case where the program is interrupted, the opposite device terminates the program. In a case where the interruption of the program does not occur, the opposite device enters the step S93 and completes the requirement processing of the IP address by acquiring the allocated IP address 60 from the processing device 2.

Figure 10:
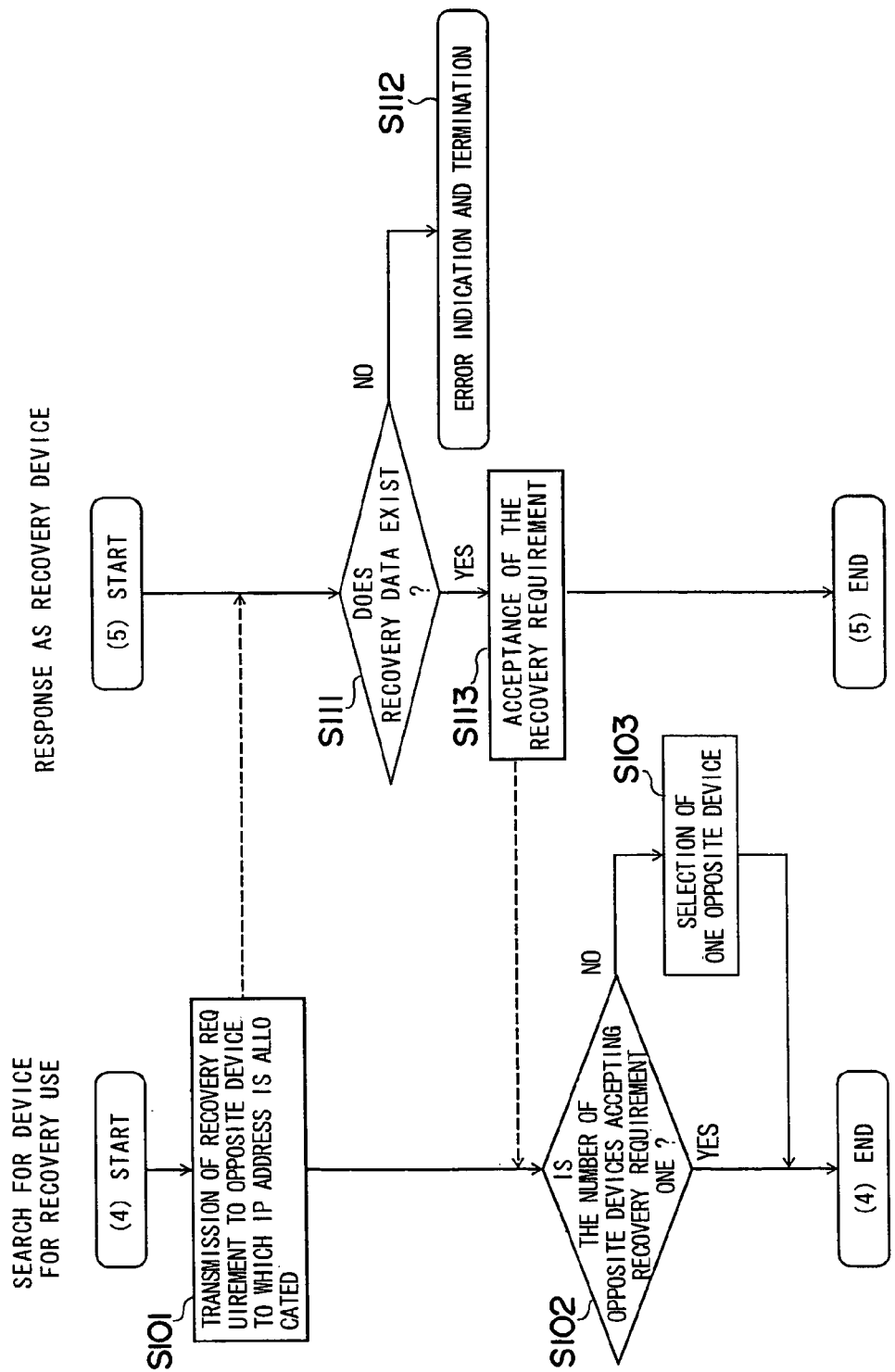
FIG. 10 is a flow diagram showing search processing of a recovery device and response processing of the recovery device in the recovery processing.

FIG. 10 shows a search processing routine of a device for recovery use and a response processing routine as a recovery device in the recovery processing. Processing of steps S101, S102 and S103 is the search processing routine of the device for recovery use at the step S31 of the processing shown in FIG. 6. Processing of steps S111, S112 and S113 is the response processing routine as a recovery device at the step S45 of the processing of the opposite device side shown in FIG. 7.

In the processing device 2, at the step S101, the recovery requirement is transmitted to the opposite device to which the IP address is allocated, and a response from the opposite device as a device for recovery use is awaited. Then, as a result of that response, whether or not the number of opposite devices accepting the recovery requirement is one device, is decided at the step S102. If the number of opposite devices accepting the recovery requirement is one device, the search processing of the device for recovery use is to be completed. However, if the number of opposite devices accepting the recovery requirement is not less than two devices, the processing device 2 enters the step S103. Since the number of opposite devices for the recovery processing is sufficient with one device, one opposite device is selected and then the search processing of the device for recovery use is completed.

To the search processing of the device for recovery use, in the opposite device located by the search, whether or not the recovery data 54 exists in the opposite device is decided at the step S111. As a result, if the recovery data 54 does not exist, the opposite device enters the step S112. At the step S112, an error indication is performed in the indicating unit 6 and the program is made to terminate.

On the other hand, if the recovery data 54 exists, the opposite device enters the step S113 and accepts the recovery requirement. Then, the acceptance of this is informed to the side of the processing device 2, and the response processing as a recovery device is terminated.

As described above, in case of the normal operation, the first basic software I (an OS and so on) 17 is made to operate via the boot program 42, and the processing in the system space 44 of the HDD 16 is performed. As opposed to this, the operating mode is recognized at the time of starting of the boot program 42 based on the change-over of the change-over switch 4, and the second basic software II 43 is started based on that recognition. The opposite device 40 for recovery use is located via the network by means of the operation of the second basic software II 43 namely the operation of the network setting software 46, and accesses are performed between the opposite device 40 and the system space 44 of the HDD 16.

In this embodiment, the processing device 2 is constituted as a server and its recovery is performed. On an ordinary occasion, the first basic software I 17 of the system space 44 is made to operate via the boot program 42. However, in case that some problem occurs in the system space 44, the processing device 2 is started from the second basic software II 43 by means of the change-over mechanism constituted by the change-over switch 4, the boot program 42 and so on, and the connection to the PC 30 as an opposite device or the opposite device 40 for recovery use is performed. By acquiring necessary information from the PC 30 or the opposite device 40, it is possible to perform the restoration and/or the update as recovery of the system developed in the HDD 16 namely both the system space 44 and the first basic software I 17. In this case, either the restoration or the update can also be performed, or both the restoration and the update can also be performed at the same time. After that, by switching the change-over switch 4 to the normal mode, the boot program 42 is made to start and the first basic software I 17 can be made to operate.

Since the processing device 2 stores the first basic software I 17 in the HDD 16 and stores the boot program 42 and the second basic software II 43 in the flash ROM 18, the first basic software I 17 or the second basic software II 43 can be made to operate separately independently by starting of the boot program 42. Consequently, necessary processing becomes possible by means of making either the first basic software I 17 or the second basic software II 43 operate. Therefore, in connection with the information processing device itself, the system developed in the HDD 16, the first basic software I 17 and so on, the strength against a failure can be improved. Moreover, a boot area of the boot program 42 and so on is stored in the flash ROM 18 which is a memory difficult to happen the data destruction, and the second basic software II 43 is further stored in this flash ROM 18. Because of this, even if a failure occurs in the first basic software I 17 and/or the system space 44 stored in the HDD 16, the boot program 42 and the second basic software II 43 are not influenced. Like this, in addition to making each memory area independent by using the HDD 16 and the flash ROM 18 as first and second storages, memory areas of the boot program 42 and the second basic software II 43 are set in the flash ROM 18. Because of this, the strength of the processing device 2 against a failure will be improved.

It is not necessary to provide the processing device 2 with means and a device for recovery, such as a CD-ROM. Because of this, information processing, such as recovery and/or update of the processing device 2 and the first basic software I 17, can be performed with ease. In particular, the recovery processing can be easily quickly performed in case of a failure such as operative badness.

In this embodiment, in order to change over the operating mode, the change-over switch 4, such as a slide switch shown in FIG. 3, is provided. By using an intuitive change-over mechanism like this, the change-over of the operating mode and the processing of the recovery, the update and so on can be facilitated. Therefore, even a user unfamiliar with an operation of the device can easily perform the operation and the processing.

Since the change-over of the operating mode and the starting control of the first basic software I 17 and the second basic software II 43 are performed by the boot program 42, an simple change-over mechanism of the change-over switch 4 and so on can be realized. By this, a flexible change-over becomes possible.

The second basic software II 43 includes the network setting software 46 and so on. Because of this, when an impropriety like a failure of the first basic software I 17 occurs, the processing of the recovery, the update and so on can be quickly performed by shifting to the processing of the second basic software II 43 from the starting of the boot program 42.

By giving various functions to the second basic software II 43, the processing device 2 can cope with a plurality of servers and can easily perform processing in accordance with a state of each server. Processing like this is impossible in a conventional boot method via a network. As a result of this, it is not necessary to provide the opposite device side for the processing device 2 with a complicated server program. Because of this, a load of the opposite device side can be reduced.

If an equal function with the first basic software I 17 is given to the second basic software II 43, the normal processing can be performed by the second basic software II 43 in case of a failure of the first basic software I 17.

Since the second basic software II 43 can be started without connecting with the first basic software I (ex. an OS) 17 placed in the system space 44, various processes can be performed irrespective of the first basic software I 17.

Because of this, various processes which can not be executed under the operating condition of the first basic software I 17, such as update of the first basic software I 17, can be performed with ease.

Figure 11:
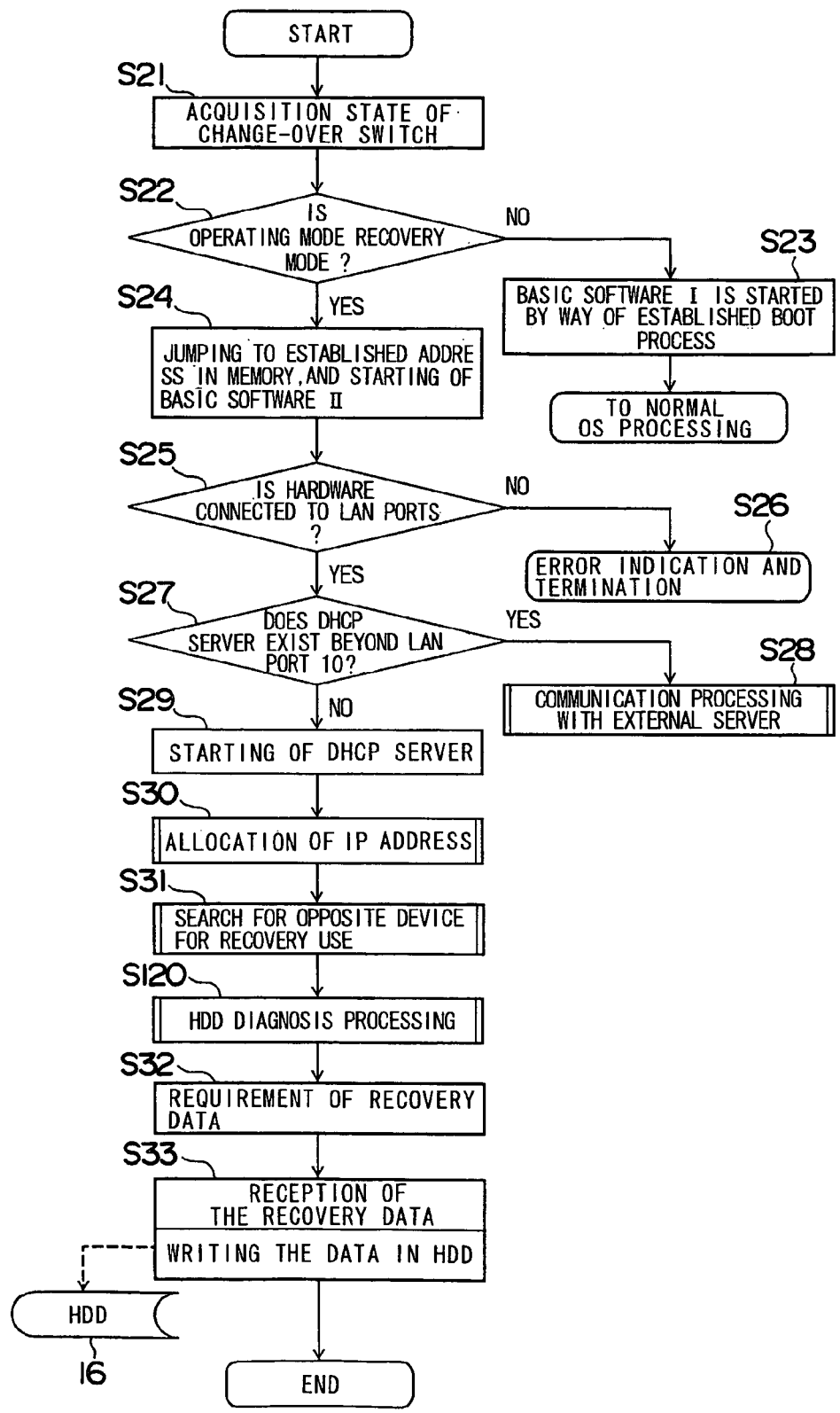
FIG. 11 is a flow diagram showing the recovery method to which HDD diagnosis processing is added.
Figure 12:
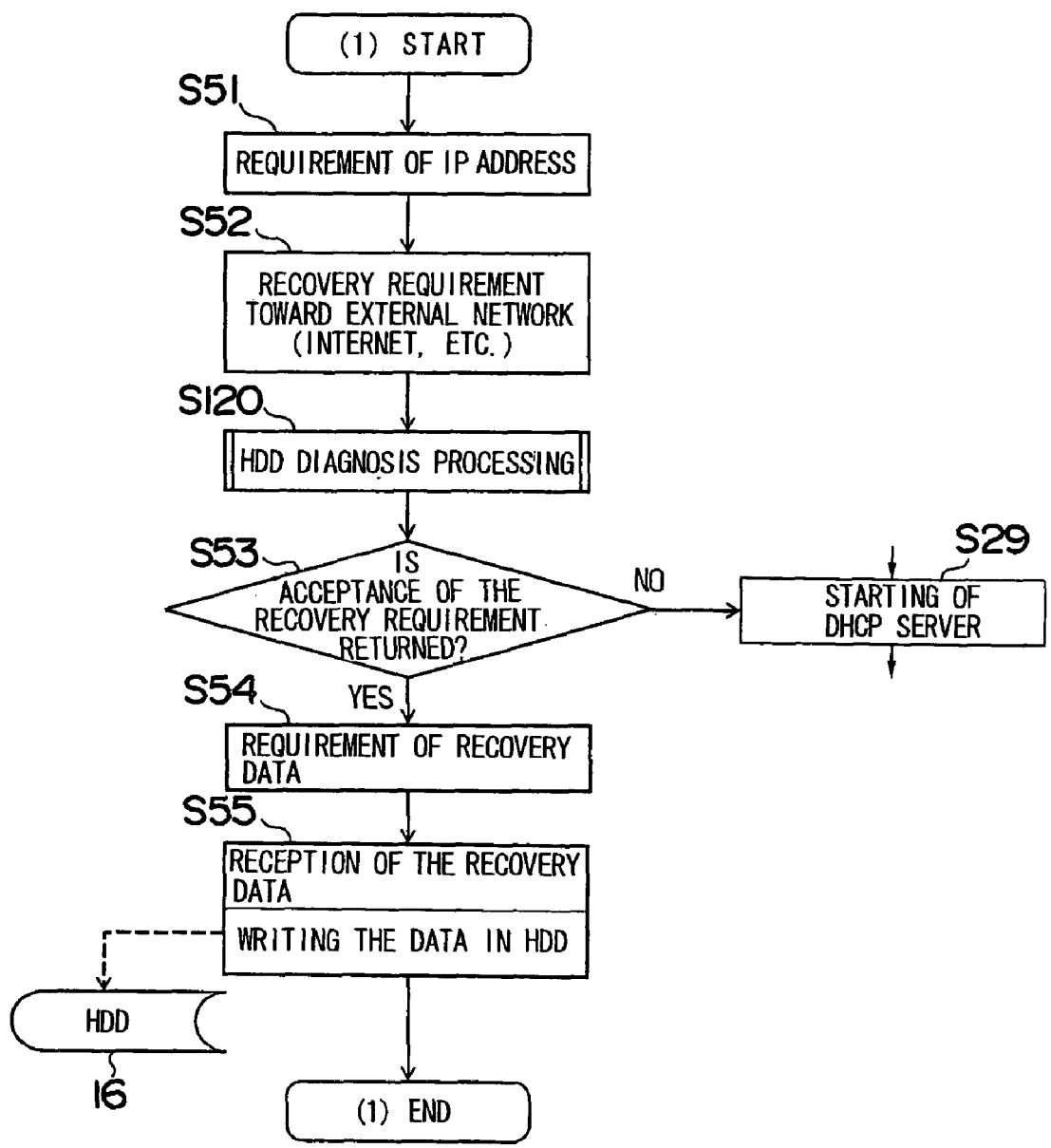
FIG. 12 is a flow diagram showing the recovery method to which the HDD diagnosis processing is added.

As another embodiment of the present invention, a recovery method having an HDD diagnosis software 48 in the second basic software II 43 is explained below. For example, as shown in FIG. 11, a step S120 is provided between the step S31 and the step S32 in the recovery processing shown in FIG. 6, and HDD diagnosis processing is performed at the step S120. Or, as shown in FIG. 12 as an example, the step S120 is provided between the step S52 and the step S53 in the recovery processing shown in FIG. 8, and the HDD diagnosis processing is performed at the step S120. By this, in case that a failure is occurring in the HDD 16, the recovery processing can be interrupted.

Figure 13:
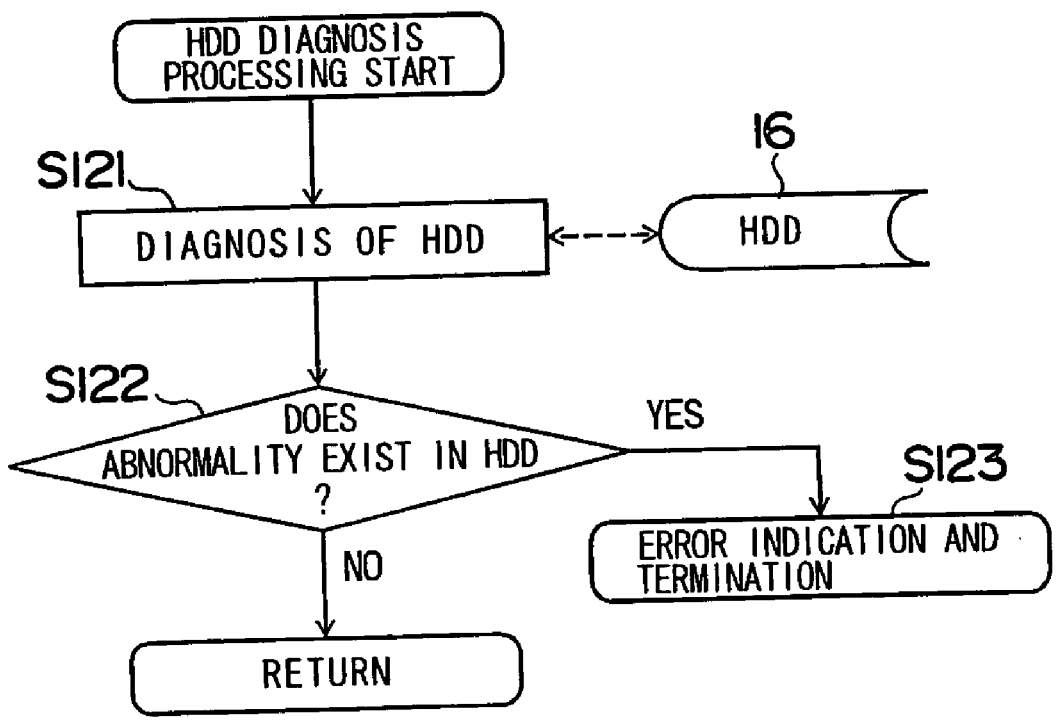
FIG. 13 is a flow diagram showing an example of the HDD diagnosis processing.

As shown in FIG. 13 as an example, the HDD diagnosis processing performs a diagnosis of the HDD 16 at a step S121, and decides at a step S122 whether or not abnormality exists in the HDD 16. In a case where the abnormality does not occur in the HDD 16, the processing device 2 enters the step S32 of the side of the main routine shown in FIG. 6 or the step S53 of the side of the main routine shown in FIG. 8, and the predetermined recovery processing is executed.

On the other hand, in a case where the abnormality exists in the HDD 16, the processing device 2 enters a step S123, and terminates the recovery processing after performing error indication in the indicating unit 6. In this case, an indicating element representing whether the HDD 16 is normal or abnormal is provided in the indicating unit 6, and the normality or the abnormality of the HDD 16 can be indicated by turning on/off the indicating element. Or, the normality or the abnormality of the HDD 16 may also be indicated by changing the on/off form of the existing indicating elements. By this, in case that the abnormality is occurring in the HDD 16, replacement or repair of the HDD 16 is to be requested without shifting to the recovery processing, and thereby an operator is released from useless processing.

Other embodiments of the information processing device and the recovery method thereof according to the present invention are explained below.

In the embodiments described above, the HDD 16 is provided as a first storage, and the flash ROM 18 is provided as a second storage. However, this is not intended to limit the scope of the present invention. A plurality of flash ROMs are provided as a second storage, and the boot program and basic software II or III . . . as second basic software may also be stored in each flash ROM, respectively. By this constitution, the strength against a failure can be improved.

In addition, although in the above-mentioned embodiments the boot program 42 and the second basic software II 43 are stored in the flash ROM 18, the boot program and the second basic software II may also be stored in different storages. For example, the boot program and the second basic software II may also be stored separately in a plurality of flash ROMs which are provided independently.

In the recovery processing of the embodiments described above, the restoration and the update of the first basic software I 17 are performed by starting of the second basic software II 43. However, this is not intended to limit the scope of the present invention. Under the normal operation, update processing of the second basic software II may also be performed by the starting of the first basic software I.

Although in the above-mentioned embodiments the change-over mechanism of the operating mode is constituted by the change-over switch 4, this is not intended to limit the scope of the present invention. For example, a sensor or software detecting occurrence of a failure is provided, whether or not the failure exists is recognized by the sensor or the software, either the first basic software I or the second basic software II is selected from the boot program 42 based on that recognition, and the selected basic software may also be made to operate.

In addition, in the embodiments described above, it is possible to provide the boot program 42 with software voiding the change-over of the change-over switch 4 in a case where the processing device shifts to the recovery processing and the change-over switch 4 is operated in the middle of the recovery processing. By this, reliability of the processing can be further improved.

In addition, although in the above-mentioned embodiments the flash ROM 18 is used in the second storage as a memory difficult to happen the data destruction, the present invention is not intended to limit to a flash ROM. Both the first and second storages may also be constituted by a memory difficult to happen the data destruction, such as a flash ROM. Further, as a memory difficult to happen the data destruction, other memories except a flash ROM may also be used.

In addition, although in the above-mentioned embodiment the second basic software II 43 has the HDD diagnosis software 48 and whether or not a failure exists in the HDD 16 is diagnosed by the operation of the HDD diagnosis software 48, software which performs a diagnosis of hardware and/or software besides the HDD 16 may also be provided.

Although the best mode for carrying out the invention, the object, the configuration and the operation and effect have been described in detail above, the invention is not limited to such embodiment for carrying out the invention, and it is a matter of course that the invention can be variously changed or modified on the basis of a gist and split of the invention as disclosed in claims and the detailed description of the invention, and such a change or modification, and various conjectured configurations, modified examples and so forth are included in the scope of the invention, and the description of the specification and drawings are not restrictively understood.

The entire disclosure of Japanese Patent Application No.2002-253900 including specification, claims, drawings and summary are incorporated herein by reference in its entirety.

What is claimed is:

1. An information processing device connectable to a network including one or plural computers, comprising:
   a first storage that stores first basic software to be executed by said information processing device in a case where an operating mode is a first operating mode;
   a second storage that is provided separate from said first storage and stores second basic software to be executed by said information processing device in a case where the operating mode is a second operating mode; and
   a processing unit that makes a boot program operate and also makes said first basic software or said second basic software operate, said boot program making said information processing device recognize whether the operating mode is said first operating mode or said second operating mode, said processing unit making said first basic software or said second basic software operate based on the recognition of the operating mode at a time of starting of said boot program,
   wherein said first storage and said second storage are incorporated in said information processing device, wherein said first basic software includes a program for restoration or update of said second basic software or for a device diagnosis, and wherein said second basic software includes software that makes the information processing device read-in data including recovery data via the network from an opposite device on the network based on starting of said second basic software.

2. The information processing device of claim 1, wherein said second basic software includes software that makes the information processing device give an IP address in accordance with a requirement of a client via the network.

3. The information processing device of claim 1, wherein said second basic software includes software for restoration and/or update of said first basic software or a system developed in said first storage, or software for a device diagnosis.

4. The information processing device of claim 1, wherein said second storage stores said boot program and the second basic software operating in a case where the operating mode is said second operating mode.

5. The information processing device of claim 1 further comprising a mode selection part that selects said operating mode, wherein said first operating mode or said second operating mode is selected by said mode selection part.

6. The information processing device of claim 5, wherein said mode selection part is a change-over switch that changes over said operating mode.

7. The information processing device of claim 5 further comprising an indicating part that indicates the selected operating mode.

8. The information processing device of claim 1, wherein said boot program includes software that selects said first basic software or said second basic software based on recognition of whether a selected operating mode is said first operating mode or said second operating mode.

9. The information processing device of claim 1, wherein said processing unit perfonns restoration or update of said first basic software by means of software offered from an opposite device on said network, under execution of said second basic software.

10. The information processing device of claim 1, wherein said second basic software includes a program that performs restoration or update of said first basic software by means of software offered from an opposite device on said network.

11. The information processing device of claim 1, wherein said second storage is a flash memory.

12. The information processing device of claim 1, wherein said second basic software has diagnosis software for said first storage, and makes recovery processing stop in a case where a failure is occurring in said first storage.

13. A recovery method of an information processing device connectable to a network including one or plural computers, comprising:

processing that, in a case where a first operating mode is selected from the first operating mode and a second operating mode at the time of starting of a boot program, makes a first basic software stored in a first storage incorporated in said information processing device operate;

processing that, in a case where said second operating mode is selected, makes a second basic software stored in a second storage incorporated in said information processing device operate and performs a search for an opposite device from the computers on said network;

processing that connects to said opposite device, receives an offer of software from said opposite device, and performs restoration or update of said first basic software or a system developed in said first storage; and processing that reads-in data including recovery data via the network from the opposite device based on starting of said second basic software, wherein said first basic software includes a program for restoration or update of said second basic software or for a device diagnosis, and wherein said first storage is separate from said second storage.

14. The recovery method of the information processing device of claim 13, wherein said second basic software includes:

processing that specifies the opposite device for the information processing device from the computers on the network; and processing that receives the offer of the software from the specified opposite device and performs the restoration or the update of said first basic software or the system developed in said first storage.

15. The recovery method of claim 13 or 14, wherein said second basic software has diagnosis software for said first storage, and includes processing that makes processing of the restoration or the update of said first basic software stop in a case where a failure is occurring in said first storage.

16. The recovery method of claim 13 or 14, wherein said second basic software includes processing that makes the information processing device give an IP address according to a requirement of a client via the network.

17. The recovery method of claim 13 or 14, wherein said boot program includes processing that selects said first basic software or said second basic software based on recognition of whether the selected operating mode is said first operating mode or said second operating mode.

18. The recovery method of claim 13 or 14, wherein said second basic software includes processing that performs the restoration or the update of said first basic software by means of the software offered from the opposite device on said network.

19. The recovery method of claim 13 or 14, wherein said second basic software has diagnosis software for said first storage, and includes processing that makes recovery processing stop in a case where a failure is occurring in said first storage.

20. The recovery method of claim 13 or 14 further including indication processing that indicates the selected operating mode.

* * * * *